United States Patent
Kwon et al.

(10) Patent No.: US 12,499,663 B1
(45) Date of Patent: Dec. 16, 2025

(54) METHOD FOR OBTAINING TRAINING DATA BY SUPPLEMENTING USER INPUT

(71) Applicant: AIV Co., Ltd., Yongin-si (KR)

(72) Inventors: Suhyuk Kwon, Hwaseong-si (KR); Kibae Lee, Daejeon (KR); Seongdeok Bang, Seoul (KR)

(73) Assignee: AIV Co., Ltd. (KR)

( * ) Notice: Subject to any disclaimer, the term of this patent is extended or adjusted under 35 U.S.C. 154(b) by 0 days.

(21) Appl. No.: 19/229,009

(22) Filed: Jun. 5, 2025

(30) Foreign Application Priority Data

Jun. 13, 2024 (KR) ........................ 10-2024-0076859

(51) Int. Cl.
*G06V 10/774* (2022.01)
*G06N 3/08* (2023.01)

(52) U.S. Cl.
CPC ............. *G06V 10/774* (2022.01); *G06N 3/08* (2013.01)

(58) Field of Classification Search
None
See application file for complete search history.

(56) References Cited

U.S. PATENT DOCUMENTS

| | | | |
|---|---|---|---|
| 2021/0004705 A1 | 1/2021 | Kim | |
| 2021/0125068 A1 | 4/2021 | Kim et al. | |
| 2022/0293272 A1* | 9/2022 | Pang | G16H 20/00 |

FOREIGN PATENT DOCUMENTS

| | | |
|---|---|---|
| KR | 1020190090738 A | 8/2019 |
| KR | 1020200052416 A | 5/2020 |
| KR | 102384241 B1 | 4/2022 |
| KR | 1020230041983 A | 6/2023 |
| KR | 10257568 B1 | 9/2023 |
| KR | 102665859 B1 | 5/2024 |
| KR | 102672719 B1 | 6/2024 |

OTHER PUBLICATIONS

Guideline for Building Artificial Intelligence Learning Datasets, National Information Society Agency (Feb. 2021) (p. 20,30,99 Extract).

* cited by examiner

*Primary Examiner* — Leon Flores
(74) *Attorney, Agent, or Firm* — Jodi A. Reynolds, Esq; Harter Secrest & Emery LLP

(57) ABSTRACT

Disclosed is a method for managing a local model and a global model on an AI platform, the method performed by one or more processors of a computing device according to an exemplary embodiment of the present disclosure.

the method may include: obtaining a plurality of sample data; receiving a first user input for a first data set included in the plurality of sample data; receiving a second user input for a second data set excluding the first data set among the plurality of sample data; and obtaining a supplemented second data set by supplementing the second user input based on the first user input.

16 Claims, 5 Drawing Sheets

METHOD FOR OBTAINING TRAINING DATA BY SUPPLEMENTING USER INPUT

CROSS-REFERENCE TO RELATED APPLICATIONS

This application claims priority to and the benefit of Korean Patent Application No. 10-2024-0076859 filed in the Korean Intellectual Property Office on Jun. 13, 2024, the entire contents of which are incorporated herein by reference.

TECHNICAL FIELD

The present disclosure relates to a method for obtaining training data by supplementing a user input, and more particularly, to a method for receiving a first user input for a first data set included in sample data, receiving a second user input for a second data set of the sample data-excluding the first data set, and supplementing the second user input based on the first user input to obtain a supplemented second data set, so as to supplement a remaining part according to an example label reflecting a pattern of an operator with high accuracy in a process of obtaining training data, thereby reducing labeling cost and effort.

BACKGROUND ART

In the case of existing data labeling, there is a problem in that an incorrect label may be received according to a habit or skill level of each user. For example, since there is a large variation in skill level of each user with respect to data labeling, there is a problem in that a quality of labeling data is not consistent, which also affects an accuracy and a training speed of a neural network model trained with such labeling data. At this time, various kinds of data may be utilized for training the neural network model, and when inaccurate data has a negative effect on training, an additional operation is required to identify and supplement the inaccurate data. Accordingly, there is an emerging need for a method that supplements a user input to obtain the training data, thereby supplementing the remainder according to an example label that reflects a highly accurate operator's pattern, thereby reducing labeling cost and effort.

On the other hand, the present disclosure has been derived at least based on the technical background described above, but the technical problem or object of the present disclosure is not limited to solving the problems or disadvantages described above. That is, the present disclosure may cover various technical issues related to the content to be described below, in addition to the technical issues discussed above.

SUMMARY OF THE INVENTION

The present disclosure has been made in an effort to provide a method for obtaining training data by supplementing a user input, and more particularly, provides receiving a first user input for a first data set included in sample data, receiving a second user input for a second data set of the sample data excluding the first data set, and supplementing the second user input based on the first user input to obtain a supplemented second data set, so as to supplement a remaining part according to an example label reflecting a pattern of an operator with high accuracy in a process of obtaining training data, thereby reducing labeling cost and effort.

Meanwhile, a technical object to be achieved by the present disclosure is not limited to the above-mentioned technical object, and various technical objects can be included within the scope which is apparent to those skilled in the art from contents to be described below.

An exemplary embodiment of the present disclosure provides a method performed by a computing device. The method may include: obtaining sample data; receiving a first user input for a first data set included in the sample data; receiving a second user input for a second data set excluding the first data set among the sample data; and obtaining a supplemented second data set by supplementing the second user input based on the first user input.

In an embodiment of the present disclosure, the first data set included in the sample data-may include a data set sampled based on diversity for the sample data.

In an embodiment of the present disclosure, the receiving the first user input for the first data set included in the sample data-may include: receiving the first user input related to a labeling operation for the first data set included in the sample data.

In an embodiment of the present disclosure, the receiving the first user input related to the labeling operation for the first data set included in the sample data-may include: receiving a first-first user input corresponding to the first time point for the first data set; and receiving a first-second user input corresponding to the second time point after the first time point for the first data set.

In an embodiment of the present disclosure, the receiving the first user input for the first data set included in the sample data-further comprising: training a neural network model for predicting labeling information based on the first data set and the first user input.

In an embodiment of the present disclosure, the training the neural network model for predicting labeling information based on the first data set and the first user input may include: obtaining a first-second predicted user input of a second time point based on a first-first user input of a first time point by using the neural network model; and training the neural network model based on the first-second user input of the second time point included in the first user input and the first-second predicted user input.

In an embodiment of the present disclosure, the obtaining the supplemented second data set by supplementing the second user input based on the first user input may include: obtaining a first predicted user input based on the second user input by using the trained neural network model; and obtaining the supplemented second data set by supplementing the second user input based on the first predicted user input.

In an embodiment of the present disclosure, the method further comprising: performing an evaluation on the supplemented second data set; obtaining a third data set included in the sample data-based on the evaluation result; receiving a third user input for the third data set; and obtaining a supplemented third data set based on the third user input and the third data set.

In an embodiment of the present disclosure, the performing the evaluation on the supplemented second data set may include: measuring uncertainty for the supplemented second data set.

In an embodiment of the present disclosure, the obtaining the third data set included in the sample data-based on the evaluation result may include: obtaining the third data set among the sample data-requiring additional information collection based on the measured uncertainty.

Another exemplary embodiment of the present disclosure provides a computer program stored in a non-transitory computer readable medium. The computer program may cause one or more processors to perform operations for managing a local model and a global model on an AI platform when the computer program is executed by the one or more processors, and the operations may include: an operation of obtaining one or more encoded reference information, generated by encoding task information or data type information related to local training performed by one or more local servers; an operation of obtaining at least a part of parameter information of one or more local models locally trained by the one or more local servers; and an operation of updating a global model based on the one or more encoded reference information and at least a part of the parameter information of the one or more local models.

In an embodiment of the present disclosure, the operation of receiving the first user input for the first data set included in the sample data may include: an operation of receiving the first user input related to a labeling operation for the first data set included in the sample data.

In an embodiment of the present disclosure, the operation of receiving the first user input related to the labeling operation for the first data set included in the sample data may include: an operation of receiving a first-first user input corresponding to a first time point for the first data set; and an operation of receiving a first-second user input corresponding to a second time point after the first time point for the first data set.

In an embodiment of the present disclosure, the operation of receiving the first user input for the first data set included in the sample data further comprising: an operation of training a neural network model for predicting labeling information based on the first data set and the first user input.

In an embodiment of the present disclosure, the operation of training the neural network model for predicting labeling information based on the first data set and the first user input may include: an operation of obtaining a first-second predicted user input of a second time point based on a first-first user input of a first time point by using the neural network model; and an operation of training the neural network model based on the first-second user input of the second time point included in the first user input and the first-second predicted user input.

In an embodiment of the present disclosure, the operation of obtaining the supplemented second data set by supplementing the second user input based on the first user input may include: an operation of obtaining a first predicted user input based on the second user input by using the trained neural network model; and an operation of obtaining the supplemented second data set by supplementing the second user input based on the first predicted user input.

In an embodiment of the present disclosure, the operation further comprising: an operation of performing an evaluation on the supplemented second data set; an operation of obtaining a third data set included the sample data-based on the evaluation result; an operation of receiving a third user input for the third data set; and an operation of obtaining a supplemented third data set based on the third user input and the third data set.

In an embodiment of the present disclosure, the operation of performing the evaluation on the supplemented second data set may include: an operation of measuring uncertainty for the supplemented second data set.

In an embodiment of the present disclosure, the operation of obtaining the third data set included in the sample data-based on the evaluation result may include: an operation of obtaining the third data set among the sample data requiring additional information collection based on the measured uncertainty.

Yet another exemplary embodiment of the present disclosure provides a computing device. The device may include: at least one processor; and a memory, wherein the at least one processor is configured to: obtaining sample data; receive a first user input for a first data set included in the sample data; receive a second user input for a second data set excluding the first data set among the sample data; and obtain a supplemented second data set by supplementing the second user input based on the first user input.

Still yet another exemplary embodiment of the present disclosure provides a data structure included in a computer-readable storage medium. The data structure may correspond to a parameter of a neural network, and the neural network may perform the following steps at least partially based on the parameter, and the steps may include: obtaining sample data; receiving a first user input for a first data set included in the sample data; receiving a second user input for a second data set excluding the first data set among the sample data; and obtaining a supplemented second data set by supplementing the second user input based on the first user input.

According to an exemplary embodiment of the present disclosure, provided is a method for obtaining data for training a neural network model, and more particularly, a first user input for a first data set included in sample data is received, a second user input for a second data set of the sample data-excluding the first data set is received, and the second user input based on the first user input is supplemented to obtain a supplemented second data set, so as to supplement a remaining part according to an example label reflecting a pattern of an operator with high accuracy in a process of obtaining training data, thereby reducing labeling cost and effort.

Meanwhile, the effects of the present disclosure are not limited to the above-mentioned effects, and various effects can be included within the scope which is apparent to those skilled in the art from contents to be described below.

DETAILED DESCRIPTION

Figure 1:
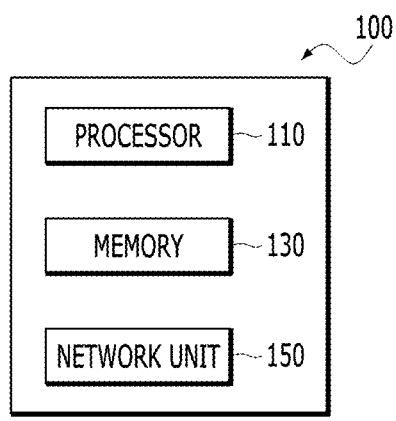
FIG. 1 is a block diagram of a computing device for obtaining data for training a neural network model according to an exemplary embodiment of the present disclosure.

Various exemplary embodiments will now be described with reference to drawings. In the present specification, various descriptions are presented to provide appreciation of the present disclosure. However, it is apparent that the exemplary embodiments can be executed without the specific description.

"Component", "module", "system", and the like which are terms used in the specification refer to a computer-related entity, hardware, firmware, software, and a combination of the software and the hardware, or execution of the software. For example, the component may be a processing procedure executed on a processor, the processor, an object, an execution thread, a program, and/or a computer, but is not limited thereto. For example, both an application executed in a computing device and the computing device may be the components. One or more components may reside within the processor and/or a thread of execution. One component may be localized in one computer. One component may be distributed between two or more computers. Further, the components may be executed by various computer-readable media having various data structures, which are stored therein. The components may perform communication through local and/or remote processing according to a signal (for example, data transmitted from another system through a network such as the Internet through data and/or a signal from one component that interacts with other components in a local system and a distribution system) having one or more data packets, for example.

The term "or" is intended to mean not exclusive "or" but inclusive "or". That is, when not separately specified or not clear in terms of a context, a sentence "X uses A or B" is intended to mean one of the natural inclusive substitutions. That is, the sentence "X uses A or B" may be applied to any of the case where X uses A, the case where X uses B, or the case where X uses both A and B. Further, it should be understood that the term "and/or" used in this specification designates and includes all available combinations of one or more items among enumerated related items.

It should be appreciated that the term "comprise" and/or "comprising" means presence of corresponding features and/or components. However, it should be appreciated that the term "comprises" and/or "comprising" means that presence or addition of one or more other features, components, and/or a group thereof is not excluded. Further, when not separately specified or it is not clear in terms of the context that a singular form is indicated, it should be construed that the singular form generally means "one or more" in this specification and the claims.

The term "at least one of A or B" should be interpreted to mean "a case including only A", "a case including only B", and "a case in which A and B are combined".

Those skilled in the art need to recognize that various illustrative logical blocks, configurations, modules, circuits, means, logic, and algorithm steps described in connection with the exemplary embodiments disclosed herein may be additionally implemented as electronic hardware, computer software, or combinations of both sides. To clearly illustrate the interchangeability of hardware and software, various illustrative components, blocks, configurations, means, logic, modules, circuits, and steps have been described above generally in terms of their functionalities. Whether the functionalities are implemented as the hardware or software depends on a specific application and design restrictions given to an entire system. Skilled artisans may implement the described functionalities in various ways for each particular application. However, such implementation decisions should not be interpreted as causing a departure from the scope of the present disclosure.

The description of the presented exemplary embodiments is provided so that those skilled in the art of the present disclosure use or implement the present disclosure. Various modifications to the exemplary embodiments will be apparent to those skilled in the art. Generic principles defined herein may be applied to other embodiments without departing from the scope of the present disclosure. Therefore, the present disclosure is not limited to the exemplary embodiments presented herein. The present disclosure should be analyzed within the widest range which is coherent with the principles and new features presented herein.

In the present disclosure, a network function and an artificial neural network and a neural network may be interchangeably used.

FIG. 1 is a block diagram of a computing device for obtaining data for training a neural network model according to an exemplary embodiment of the present disclosure.

A configuration of the computing device 100 illustrated in FIG. 1 is only an example shown through simplification. In an exemplary embodiment of the present disclosure, the computing device 100 may include other components for performing a computing environment of the computing device 100 and only some of the disclosed components may constitute the computing device 100.

The computing device 100 may include a processor 110, a memory 130, and a network unit 150.

The processor 110 may be constituted by one or more cores and may include processors for data analysis and deep learning, which include a central processing unit (CPU), a general purpose graphics processing unit (GPGPU), a tensor processing unit (TPU), and the like of the computing device. The processor 110 may read a computer program stored in the memory 130 to perform data processing for machine learning according to an exemplary embodiment of the present disclosure. According to an exemplary embodiment of the present disclosure, the processor 110 may perform a calculation for training the neural network. The processor 110 may perform calculations for training the neural network, which include processing of input data for training in deep learning (DL), extracting a feature in the input data, calculating an error, updating a weight of the neural network using backpropagation, and the like. At least one of the CPU, GPGPU, and TPU of the processor 110 may process training of a network function. For example, both the CPU and the GPGPU may process the training of the network function and data classification using the network function. Further, in an exemplary embodiment of the present disclosure, processors of a plurality of computing devices may be used together to process the training of the network function and the data classification using the network function. Further, the computer program executed in the computing device according to an exemplary embodiment of the present disclosure may be a CPU, GPGPU, or TPU executable program.

According to an exemplary embodiment of the present disclosure, the memory 130 may store any type of information generated or determined by the processor 110 and any type of information received by the network unit 150.

According to an exemplary embodiment of the present disclosure, the memory 130 may include at least one type of storage medium of a flash memory type storage medium, a hard disk type storage medium, a multimedia card micro type storage medium, a card type memory (for example, an SD or XD memory, or the like), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk. The computing device 100 may operate in connection with a web storage performing a storing function of the memory 130 on the Internet. The description of the memory is just an example and the present disclosure is not limited thereto.

The network unit 150 according to an exemplary embodiment of the present disclosure may use various wired communication systems such as public switched telephone network (PSTN), x digital subscriber line (xDSL), rate adaptive DSL (RADSL), multi rate DSL (MDSL), very high speed DSL (VDSL), universal asymmetric DSL (UADSL), high bit rate DSL (HDSL), and local area network (LAN).

The network unit 150 presented in the present disclosure may use various wireless communication systems such as code division multi access (CDMA), time division multi access (TDMA), frequency division multi access (FDMA), orthogonal frequency division multi access (OFDMA), single carrier-FDMA (SC-FDMA), and other systems.

In the present disclosure, the network unit 110 may be configured regardless of a communication aspect, such as wired communication and wireless communication, and may be configured by various communication networks, such as a Personal AreaNetwork (PAN) and a Wide Area Network (WAN). Further, the network may be a publicly known World Wide Web (WWW), and may also use a wireless transmission technology used in short range communication, such as Infrared Data Association (IrDA) or Bluetooth.

Figure 2:
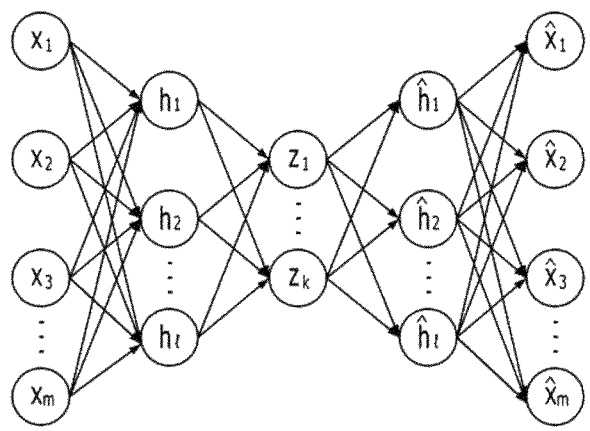
FIG. 2 is a schematic diagram illustrating a network function according to an exemplary embodiment of the present disclosure.

FIG. 2 is a conceptual view illustrating a neural network according to an exemplary embodiment of the present disclosure.

Throughout the present specification, a computation model, the neural network, a network function, and the neural network may be used as the same meaning. The neural network may be generally constituted by an aggregate of calculation units which are mutually connected to each other, which may be called nodes. The nodes may also be called neurons. The neural network is configured to include one or more nodes. The nodes (alternatively, neurons) constituting the neural networks may be connected to each other by one or more links.

In the neural network, one or more nodes connected through the link may relatively form the relationship between an input node and an output node. Concepts of the input node and the output node are relative and a predetermined node which has the output node relationship with respect to one node may have the input node relationship in the relationship with another node and vice versa. As described above, the relationship of the input node to the output node may be generated based on the link. One or more output nodes may be connected to one input node through the link and vice versa.

In the relationship of the input node and the output node connected through one link, a value of data of the output node may be determined based on data input in the input node. Here, a link connecting the input node and the output node to each other may have a weight. The weight may be variable and the weight is variable by a user or an algorithm in order for the neural network to perform a desired function. For example, when one or more input nodes are mutually connected to one output node by the respective links, the output node may determine an output node value based on values input in the input nodes connected with the output node and the weights set in the links corresponding to the respective input nodes.

As described above, in the neural network, one or more nodes are connected to each other through one or more links to form a relationship of the input node and output node in the neural network. A characteristic of the neural network may be determined according to the number of nodes, the number of links, correlations between the nodes and the links, and values of the weights granted to the respective links in the neural network. For example, when the same number of nodes and links exist and there are two neural networks in which the weight values of the links are different from each other, it may be recognized that two neural networks are different from each other.

The neural network may be constituted by a set of one or more nodes. A subset of the nodes constituting the neural network may constitute a layer. Some of the nodes constituting the neural network may constitute one layer based on the distances from the initial input node. For example, a set of nodes of which distance from the initial input node is n may constitute n layers. The distance from the initial input node may be defined by the minimum number of links which should be passed through for reaching the corresponding node from the initial input node. However, a definition of the layer is predetermined for description and the order of the layer in the neural network may be defined by a method different from the aforementioned method. For example, the layers of the nodes may be defined by the distance from a final output node.

The initial input node may mean one or more nodes in which data is directly input without passing through the links in the relationships with other nodes among the nodes in the neural network. Alternatively, in the neural network, in the relationship between the nodes based on the link, the initial input node may mean nodes which do not have other input nodes connected through the links. Similarly thereto, the final output node may mean one or more nodes which do not have the output node in the relationship with other nodes among the nodes in the neural network. Further, a hidden node may mean nodes constituting the neural network other than the initial input node and the final output node.

In the neural network according to an exemplary embodiment of the present disclosure, the number of nodes of the input layer may be the same as the number of nodes of the output layer, and the neural network may be a neural network of a type in which the number of nodes decreases and then, increases again from the input layer to the hidden layer. Further, in the neural network according to another exemplary embodiment of the present disclosure, the number of nodes of the input layer may be smaller than the number of nodes of the output layer, and the neural network may be a neural network of a type in which the number of nodes decreases from the input layer to the hidden layer. Further, in the neural network according to yet another exemplary embodiment of the present disclosure, the number of nodes of the input layer may be larger than the number of nodes of the output layer, and the neural network may be a neural network of a type in which the number of nodes increases from the input layer to the hidden layer. The neural network according to still yet another exemplary embodiment of the present disclosure may be a neural network of a type in which the neural networks are combined.

A deep neural network (DNN) may refer to a neural network that includes a plurality of hidden layers in addition to the input and output layers. When the deep neural network is used, the latent structures of data may be determined. That is, latent structures of photos, text, video, voice, and music (e.g., what objects are in the photo, what the content and feelings of the text are, what the content and feelings of the voice are) may be determined. The deep neural network may include a convolutional neural network (CNN), a recurrent neural network (RNN), an auto encoder, generative adversarial networks (GAN), a restricted Boltzmann machine (RBM), a deep belief network (DBN), a Q network, a U network, a Siam network, a Generative Adversarial Network (GAN), and the like. The description of the deep neural network described above is just an example and the present disclosure is not limited thereto.

In an exemplary embodiment of the present disclosure, the network function may include the auto encoder. The auto encoder may be a kind of artificial neural network for outputting output data similar to input data. The auto encoder may include at least one hidden layer and odd hidden layers may be disposed between the input and output layers. The number of nodes in each layer may be reduced from the number of nodes in the input layer to an intermediate layer called a bottleneck layer (encoding), and then expanded symmetrical to reduction to the output layer (symmetrical to the input layer) in the bottleneck layer. The auto encoder may perform non-linear dimensional reduction. The number of input and output layers may correspond to a dimension after preprocessing the input data. The auto encoder structure may have a structure in which the number of nodes in the hidden layer included in the encoder decreases as a distance from the input layer increases. When the number of nodes in the bottleneck layer (a layer having a smallest number of nodes positioned between an encoder and a decoder) is too small, a sufficient amount of information may not be delivered, and as a result, the number of nodes in the bottleneck layer may be maintained to be a specific number or more (e.g., half of the input layers or more).

The neural network may be trained in at least one scheme of supervised learning, unsupervised learning, semi supervised learning, or reinforcement learning. The learning of the neural network may be a process in which the neural network applies knowledge for performing a specific operation to the neural network.

The neural network may be trained in a direction to minimize errors of an output. The training of the neural network is a process of repeatedly inputting training data into the neural network and calculating the output of the neural network for the training data and the error of a target and back-propagating the errors of the neural network from the output layer of the neural network toward the input layer in a direction to reduce the errors to update the weight of each node of the neural network. In the case of the supervised learning, the training data labeled with a correct answer is used for each training data (i.e., the labeled training data) and in the case of the unsupervised learning, the correct answer may not be labeled in each training data. That is, for example, the training data in the case of the supervised learning related to the data classification may be data in which category is labeled in each training data. The labeled training data is input to the neural network, and the error may be calculated by comparing the output (category) of the neural network with the label of the training data. As another example, in the case of the unsupervised learning related to the data classification, the training data as the input is compared with the output of the neural network to calculate the error. The calculated error is back-propagated in a reverse direction (i.e., a direction from the output layer toward the input layer) in the neural network and connection weights of respective nodes of each layer of the neural network may be updated according to the back propagation. A variation amount of the updated connection weight of each node may be determined according to a learning rate. Calculation of the neural network for the input data and the back-propagation of the error may constitute a training cycle (epoch). The learning rate may be applied differently according to the number of repetition times of the training cycle of the neural network. For example, in an initial stage of the training of the neural network, the neural network ensures a certain level of performance quickly by using a high learning rate, thereby increasing efficiency and uses a low learning rate in a latter stage of the training, thereby increasing accuracy.

In training of the neural network, the training data may be generally a subset of actual data (i.e., data to be processed using the trained neural network), and as a result, there may be a training cycle in which errors for the training data decrease, but the errors for the actual data increase. Overfitting is a phenomenon in which the errors for the actual data increase due to excessive training of the training data. For example, a phenomenon in which the neural network that trains a cat by showing a yellow cat sees a cat other than the yellow cat and does not recognize the corresponding cat as the cat may be a kind of overfitting. The overfitting may act as a cause which increases the error of the machine learning algorithm. Various optimization methods may be used in order to prevent the overfitting. In order to prevent the overfitting, a method such as increasing the training data, regularization, dropout of omitting a part of the node of the network in the process of training, utilization of a batch normalization layer, etc., may be applied.

Figure 3:
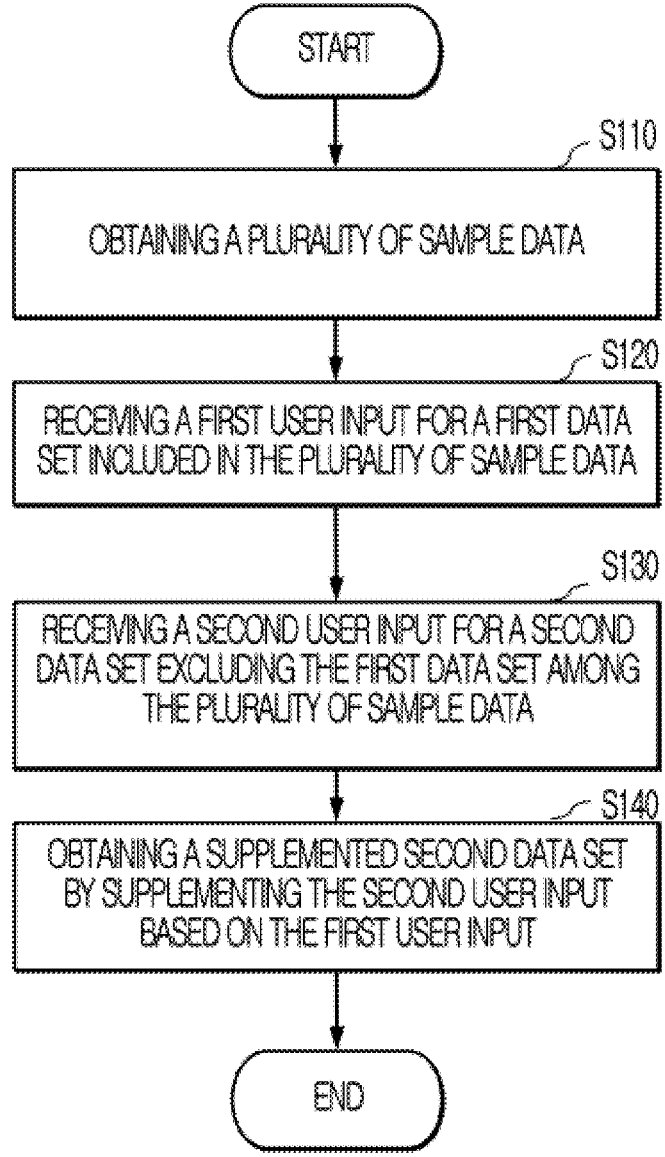
FIG. 3 is a flowchart illustrating a method for obtaining data for training the neural network model according to an exemplary embodiment of the present disclosure.

FIG. 3 is a flowchart illustrating a method for obtaining data for training the neural network model according to an exemplary embodiment of the present disclosure.

A computing device 100 according to an exemplary embodiment of the present disclosure may directly obtain or receive, from an external system, "information for obtaining data for training a neural network model". The external system may be a server, database or the like that stores and manages information regarding the data for training the neural network model. The computing device 100 may use the information obtained directly or received from the external system as "input data for obtaining the data for training the neural network model".

According to an exemplary embodiment of the present disclosure, the computing device 100 may obtain sample data (S110). At this time, the sample data may include surface defect image data used for surface defect inspection of an object, and may be composed of a plurality of categories such as scratches, cracks, stabbing, dents, and stains. However, the surface defect image data and categories such as scratches, cracks, stabbing, etc., are only examples, and the sample data of the present disclosure is not limited thereto and may include various examples. In addition, the sample data-may be utilized in a process of training a neural network model that predicts a probability that data belongs to a specific class, and the sample data-may include an image classification model, but are not limited thereto. Meanwhile, the sample data-may be used in a process of obtaining a supplemented data set, which will be described below.

According to an exemplary embodiment of the present disclosure, the computing device 100 may receive a first user input for a first data set included in the sample data obtained through step S110 (S120). At this time, the first data set included in the sample data-may include a data set sampled based on diversity with respect to the plurality of the sample data. For example, the computing device 100 may perform clustering on the sample data to sample data corresponding to a center of each cluster, thereby obtaining the first data set, but various exemplary embodiments may be utilized in a process of obtaining the first data set sampled based on diversity. Specifically, the computing device 100 may receive a first user input related to a labeling operation for the first data set included in the sample data. At this time, the first user input related to the labeling operation may include a click, a touch, or the like input for specifying a defect region for at least one data in the first data set, but is not limited thereto. In this regard, it is important for the computing device 100 to obtain the defect region that includes the most features of a defect in performing recognition and labeling of a visual defect region on training data to train a defect inspection model. This is because, if a shape of an object region is not suitable for the object to be identified, too much unnecessary background may be included in the object region, or a feature of an object to be distinguished may not be sufficiently contained in the object region. Thus, the computing device 100 may include shape information of the defect region in the first data set to enable accurate defect inspection to be performed, and receive the first user input to better represent the defect region, thereby obtaining labeling data that may be utilized in the process of training the defect inspection model to infer an appropriate defect region. For example, the computing device 100 may receive a first-1 user input, corresponding to a first time point, for the first data set, and a first-2 user input, corresponding to a second time point after the first time point, for the first data set. Specifically, the first user input related to the labeling operation may include a continuous user input for specifying the defect region for at least one data of the first data set, such that the computing device 100 may utilize the first user input in association with time-series data at a received time point. Additionally, the computing device 100 may train a neural network model for predicting labeling information based on the first data set and the first user input. In this case, examples of the neural network model for predicting the labeling information may include a time-series prediction model such as a recurrent neural network (RNN). In this regard, the recurrent neural network is characterized in that a connection between units has a recurrent structure, which allows a state to be stored inside a neural network to model a time-varying dynamic feature. Accordingly, unlike a forward delivery neural network, the recurrent neural network may process a sequence type input by using an internal memory. For example, the recurrent neural network may process data having the time-varying feature such as handwriting recognition or voice recognition. However, the description of the data or recurrent neural network described above is just an example and the present disclosure is not limited thereto. As a specific example, the computing device 100 may utilize the neural network model to obtain a first-2 predicted user input of a second time point based on a first-1 user input of a first time point, and to train the neural network model by comparing a first-2 user input of the second time point included in the first user input with the first-2 predicted user input to reduce a difference therebetween. Meanwhile, a specific description for the process of training the neural network model by the computing device 100 will be described below through FIG. 5.

According to an exemplary embodiment of the present disclosure, the computing device 100 may receive a second user input for a second data set of the sample data excluding the first data set among in step S110 (S130). In this case, the second user input may be distinct from the first user input. Specifically, in the present disclosure, a user input for the first data set may refer to the first user input, and a user input for remaining data of the sample data-excluding the first data set may refer to the second user input. Further, the second user input may be related to the labeling operation, and the second user input may include an input such as a click, a touch, or the like for specifying a defect region for at least one data in the second data set, but is not limited thereto. Meanwhile, the computing device 100 may supplement the second user input based on the first user input with respect to the second data set in which the second user input is received, and a description related thereto will be described below.

According to an exemplary embodiment of the present disclosure, the computing device 100 may supplement the second user input received through step S130 based on the first user input received through step S120 to obtain a supplemented second data set (S140). For example, the computing device 100 may utilize the trained neural network model to obtain a first predicted user input based on the second user input and supplement the second user input based on the first predicted user input to obtain the supplemented second data set. Specifically, the computing device 100 may receive a second-1 user input for a first' time point for second-1 data in the second data set, and input the second-1 user input and the second-1 data into the trained neural network model to obtain a first-2 predicted user input. Thereafter, the computing device 100 may supplement inputs after the second-1 user input based on the first-2 predicted user input to obtain the supplemented second data set. Through this, the computing device 100 may supplement the second user input based on the first user input, and obtain the supplemented second data set, so as to supplement a remaining part according to an example label reflecting a pattern of an operator with high accuracy in a process of obtaining training data, thereby achieving a technical effect of reducing labeling cost and effort.

Additionally, the computing device 100 may perform evaluation on the supplemented second data set and obtain a third data set included in the sample data-based on a result of the evaluation. In this case, the computing device 100 may perform the evaluation on the supplemented second data set by measuring an uncertainty for the supplemented second data set, and a process of measuring the uncertainty may utilize a scheme of measuring whether a variance, a standard deviation, or the like of the supplemented second data set is equal to or larger than a predetermined threshold, but is not limited thereto, and various uncertainty measurement schemes may be utilized, such as a data quality evaluation of data missing, data mismatch, or the like, or a machine learning model-based evaluation of Bayesian inference, or the like. Further, the computing device 100 may obtain, as the third data set, data of the sample data for which the measured uncertainty is equal to or larger than a predetermined threshold, when the measured uncertainty is equal to or larger than the predetermined threshold. In this regard, the computing device 100 may predict the third data set as data on which additional information needs to be collected, and may receive a third user input for the third data set. In this case, the third user input may be related to a labeling operation for the third data set, and the third user input may include an input such as a click, a touch, or the like for specifying a defect region for at least one data in the third data set, but is not limited thereto. Further, the computing device 100 may obtain a supplemented third data set based on the third user input and the third data set. Through this, the computing device 100 may obtain a third data set by supplementing, through the third user input, the third data set with high uncertainty among the sample data, thereby mitigating a technical problem that may cause an error in a model training process and degrade generalization performance of the model. Meanwhile, a specific description for the process of obtaining the third data set by the computing device 100 will be described below through FIG. 7.

Figure 4:
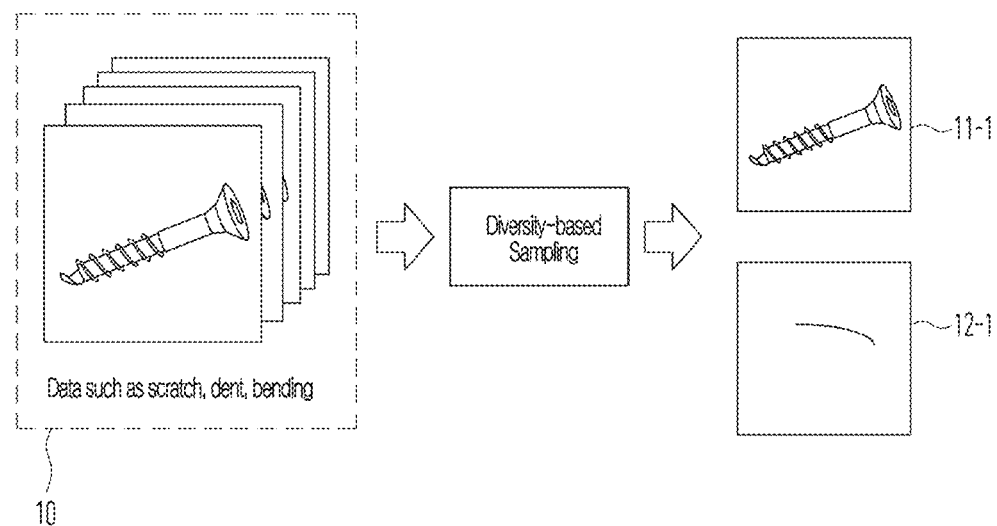
FIG. 4 is a schematic diagram for describing a process of obtaining a first data set included in sample data according to an exemplary embodiment of the present disclosure.

FIG. 4 is a schematic diagram for describing a process of obtaining a first data set included in sample data according to an exemplary embodiment of the present disclosure.

Referring to FIG. 4, the computing device 100 may obtain sample data 10. In this case, the sample data-10 may include surface defect image data used for surface defect inspection of an object, and may be composed of a plurality of categories such as scratches, cracks, stabbing, dents, and stains. For example, examples of the sample data 10 may include an image of a part screw, an image of a surface of an iron steel sheet, or the like, and may include an image of a defective screw in which an end portion of the part screw is bent, an image of the surface of the iron steel sheet having a scratch defect, or the like. However, the surface defect image data and categories such as scratches, cracks, stabbing, etc., are only examples, and the sample data 10 of the present disclosure is not limited thereto and may include various examples. In addition, the sample data-10 may be utilized in a process of training a neural network model that predicts a probability that data belongs to a specific class, and the sample data-10 may include an image classification model, and the like, but are not limited thereto. Meanwhile, the computing device 100 may obtain a first data set 11-1 or 12-1 by sampling data based on diversity with respect to the sample data 10. For example, the computing device 100 may perform clustering on the sample data-10 and sample data corresponding to the center of each cluster to obtain the first data set 11-1 or 12-1 in which the feature of each defect category of the surface defect image data included in the plurality of the sample data 10 is well represented. As a specific example, the computing device 100 may perform clustering on the sample data-10 including surface defect image data, and sample data corresponding to the center of each cluster to obtain the first data set 11-1 or 12-1 including an image 11-1 of a defective screw having a bent end portion, an image 12-1 of a surface of an iron steel sheet having a scratch defect, and the like. However, various exemplary embodiments may be utilized in a process in which the computing device 100 obtains the first data set 11-1 or 12-1 sampled based on the diversity with respect to the sample data 10, without being limited to clustering. Meanwhile, the first data set 11-1 or 12-1 may be utilized in a process in which the computing device 100 obtains the supplemented first data set, which is described below with reference to FIGS. 5 and 6.

Figure 5:
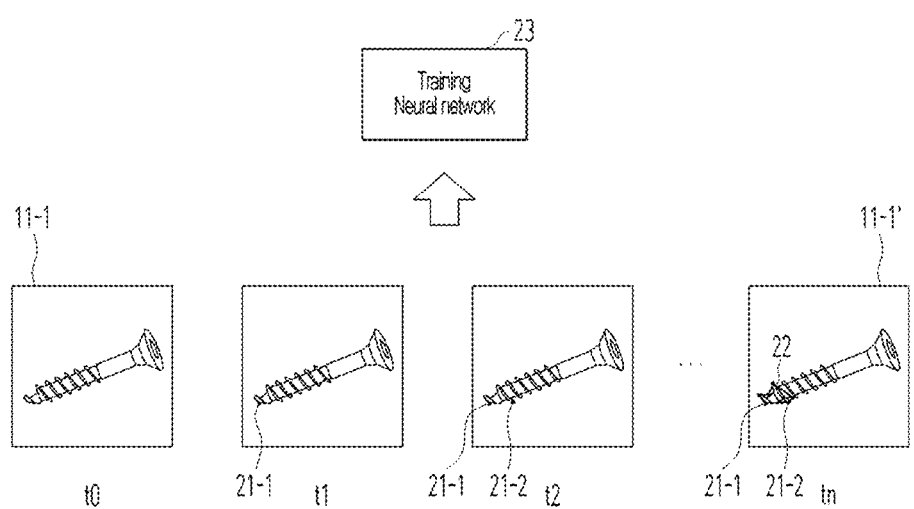
FIG. 5 is a schematic diagram for describing a process of receiving a first user input for the first data set included in the sample data according to an exemplary embodiment of the present disclosure.

FIG. 5 is a schematic diagram for describing a process of receiving a first user input for the first data set included in the sample data-according to an exemplary embodiment of the present disclosure.

Referring to FIG. 5, the computing device 100 may receive first user inputs 21-1 to 21-2 related to the labeling operation on the first data set 11-1 or 12-1 included in the sample data-10. At this time, the first user inputs 21-1 to 21-2 related to the labeling operation may include an input such as a click, a touch, or the like for specifying the defect region for at least one data in the first data set, but are not limited thereto. In this regard, it is important for the computing device 100 to obtain a defect region that includes the most features of a defect in performing recognition and labeling of a visual defect region on training data to train the defect inspection model. This is because, if a shape of an object region is not suitable for the object to be identified, too much unnecessary background may be included in the object region, or a feature of an object to be distinguished may not be sufficiently contained in the object region. Thus, the computing device 100 may include shape information of the defect region in the first data set 11-1 or 12-1 to enable accurate defect inspection to be performed, and receive the first user inputs 21-1 to 21-2 to better represent the defect region, thereby obtaining labeling data that may be utilized in the process of training the defect inspection model to infer an appropriate defect region. For example, the computing device 100 may receive the first-1 user input 21-1 corresponding to a first time point t1 for the image 11-1 of the part screw included in the first data sets 21-1 to 21-2, and receive the first-2 user input 21-2 corresponding to a second time point t2 after the first time point t1, for the image 11-1 of the part screw. In this regard, the first user inputs 21-1 to 21-2 related to the labeling operation may include a continuous user input for specifying the defect region for at least one data 11-1 of the first data set, such that the computing device 100 may utilize the first user inputs in association with time-series data of a received time point. Specifically, the computing device 100 may obtain the image 11-1' of the part screw including the labeling information by receiving the sequential first user inputs 21-1 to 21-2 on the image 11-1 of the part screw, and the computing device 100 may train a neural network model 23 for predicting the labeling information based on the image 11-1' of the part screw including the labeling information. Specifically, the computing device 100 may utilize the neural network model to obtain a first-2 predicted user input of a second time point based on a first-1 user input 21-1 of a first time point t1, and to train the neural network model by comparing a first-2 user input 21-2 of the second time point included in the first user inputs 21-1 to 21-2 with the first-2 predicted user input to reduce a difference therebetween. In this case, the neural network model 23 for predicting the labeling information may exemplarily include a time-series prediction model such as a recurrent neural network (RNN). In this regard, the recurrent neural network is characterized in that a connection between units has a recurrent structure, which allows a state to be stored inside a neural network to model a time-varying dynamic feature. Accordingly, unlike a forward delivery neural network, the recurrent neural network may process a sequence type input by using an internal memory. For example, the recurrent neural network may process data having the time-varying feature such as handwriting recognition or voice recognition. However, the description of the data or recurrent neural network described above is just an example and the present disclosure is not limited thereto. Meanwhile, the computing device 100 may utilize the trained neural network model to predict the user input of the second time point based on the first-1 user input 21-1 of the first time point, which may be utilized in a process of supplementing the second user input, which will be described in detail below with reference to FIG. 6 below.

Figure 6:
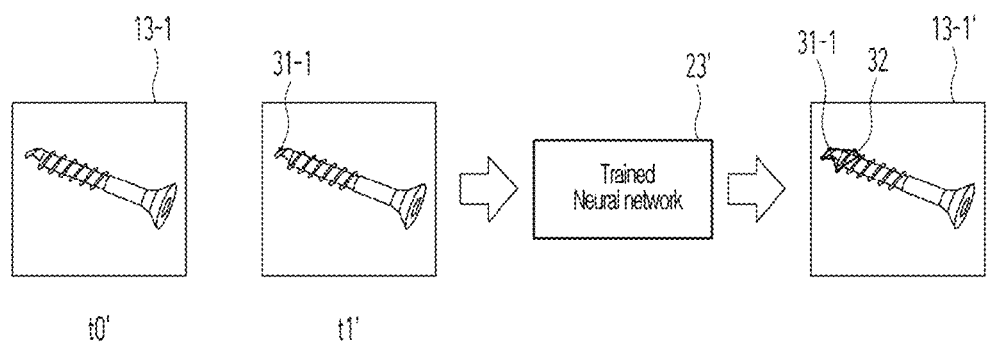
FIG. 6 is a schematic diagram for describing a process of receiving a second user input for a second data set the sample data-sets excluding the first data set and obtaining a supplemented second data set according to an exemplary embodiment of the present disclosure.

FIG. 6 is a schematic diagram for describing a process of receiving a second user input for a second data set of the sample data sets excluding the first data set and obtaining a supplemented second data set according to an exemplary embodiment of the present disclosure.

Referring to FIG. 6, the computing device 100 may receive a second user input 31-1 for a second data set of the sample data-10 excluding the first data set 11-1 or 12-1. In this case, the second user input 31- may be distinct from the first user inputs 21-1 to 21-2. Specifically, in the present disclosure, the user input for the first data set may refer to the first user inputs 21-1 to 21-2, and the user input for remaining data of the sample data-10 excluding the first data set 11-1 or 12-1 may refer to the second user input 31-1. Further, the second user input 31-1 may be related to the labeling operation, and the second user input 31-1 may include an input such as a click, a touch, or the like for specifying a defect region for at least one data 13-1 in the second data set, but is not limited thereto. Specifically, the computing device 100 may utilize a neural network model 23' trained based on the received first user inputs 21-1 to 21-2 to obtain a first predicted user input 32 based on the second user input 31-1, and supplement the second user input 31-1 based on the first predicted user input 32 to obtain a supplemented second data 13-1'. Specifically, the computing device 100 may receive a second-1 user input 31-1 for a first' time point t1' for the second-1 data 13-1 in the second data set, and input the second-1 user input 31-1 and the second-1 data 13-1 into the trained neural network model 23' to obtain the first-2 predicted user input 32. Thereafter, the computing device 100 may supplement inputs after the second-1 user input 31-1 based on the first-2 predicted user input 32 to obtain the supplemented second-1 data 13-1'. Through this, the computing device 100 may supplement the second user input 31-1 through the neural network model 23' trained based on the first user inputs 21-1 to 21-2, and obtain the supplemented second data 13-1', so as to supplement a remaining part according to an example label reflecting a pattern of an operator with high accuracy in a process of obtaining the labeled training data, thereby achieving a technical effect of reducing labeling cost and effort. Meanwhile, the computing device 100 may perform an evaluation on the supplemented second data set to obtain more accurate labeling data so as to prevent an error in a model training process, and obtain a third data set based thereon, which will be described below with reference to FIG. 7 below.

Figure 7:
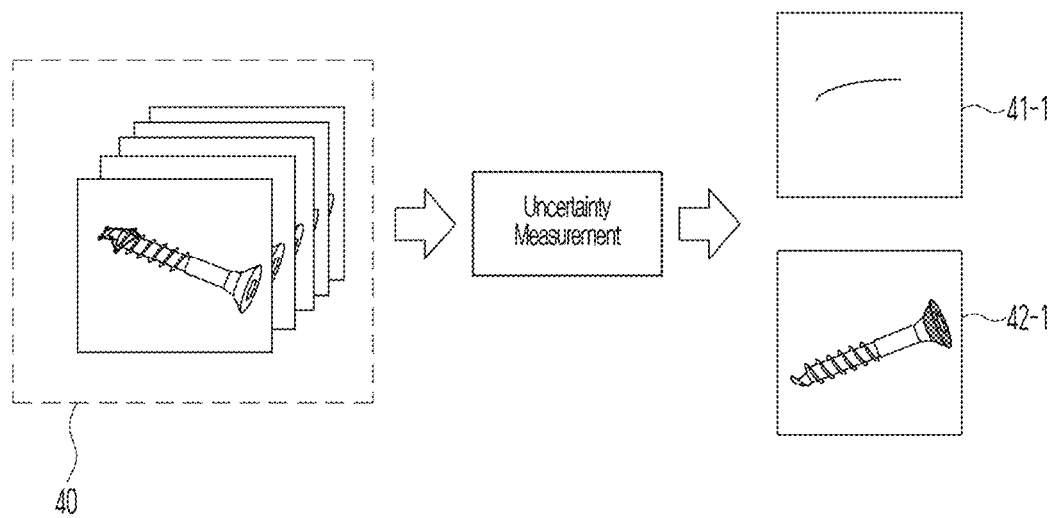
FIG. 7 is a schematic diagram for describing a process of performing evaluation on the supplemented second data set and obtaining a third data set among the sample data based on a result of the evaluation, according to an exemplary embodiment of the present disclosure.

FIG. 7 is a schematic diagram for describing a process of performing evaluation on the supplemented second data set and obtaining a third data set among the sample data based on a result of the evaluation, according to an exemplary embodiment of the present disclosure.

Referring to FIG. 7, the computing device 100 may perform an evaluation on a supplemented second data set 40 and obtain a third data set 41-1 or 42-1 included in the sample data-10 based on a result of the evaluation. In this case, the computing device 100 may perform the evaluation on the supplemented second data set 40 by measuring an uncertainty for the supplemented second data set 40, and a process of measuring the uncertainty may utilize a scheme of measuring whether a variance, a standard deviation, or the like of the supplemented second data set 40 is equal to or larger than a predetermined threshold, but is not limited thereto, and various uncertainty measurement schemes may also be utilized, such as a data quality evaluation of data missing, data mismatch, or the like, or a machine learning model-based evaluation of Bayesian inference, or the like. Further, the computing device 100 may obtain, as the third data set 41-1 or 42-1, data of the sample data-10 for which the measured uncertainty is equal to or larger than a predetermined threshold, when the uncertainty measured for the supplemented second data set 40 is equal to or larger than the predetermined threshold. In this regard, the computing device 100 may predict the third data set 41-1 or 42-1 as data for which additional information needs to be collected, and may receive a third user input for the third data set 41-1 or 42-1. Specifically, referring to the example of FIG. 7, the computing device 100 may predict, among the sample data-10, an image 41-1 in which the iron steel sheet the measured uncertainty is equal to or larger than a predetermined threshold has a scratch defect or an image 42-1 of the iron steel sheet in which a head portion of the part screw has a defect as data requiring additional information collection. In addition, the computing device 100 may receive at least one of "a third-1 user input of labeling a scratch defect region for the image 41-1 of the iron steel sheet with the scratch defect" or "a third-2 user input of labeling the defect region of the head portion for the image 42-1 of the part screw with a defect". In this case, the third user input may be related to a labeling operation for the third data set 41-1 or 42-1, and the third user input may include an input such as a click, a touch, or the like for specifying a defect region for at least one data in the third data set 41-1 or 42-1, but is not limited thereto. Further, the computing device 100 may obtain a supplemented third data set based on the third user input and the third data set 41-1 or 42-1. Through this, the computing device 100 may obtain a third data set by supplementing, through the third user input, the third data set 41-1 or 42-1 with high uncertainty among the sample data, thereby mitigating a technical problem that may cause an error in the model training process and degrade generalization performance of the model.

Exemplary Embodiment of the Present Disclosure

The data structure may refer to the organization, management, and storage of data that enables efficient access to and modification of data. The data structure may refer to the organization of data for solving a specific problem (e.g., data search, data storage, data modification in the shortest time). The data structures may be defined as physical or logical relationships between data elements, designed to support specific data processing functions. The logical relationship between data elements may include a connection between data elements that the user defines. The physical relationship between data elements may include an actual relationship between data elements physically stored on a computer-readable storage medium (e.g., persistent storage device). The data structure may specifically include a set of data, a relationship between the data, a function which may be applied to the data, or instructions. Through an availability designed data structure, a computing device can perform operations while using the resources of the computing device to a minimum. Specifically, the computing device can increase the efficiency of operation, read, insert, delete, compare, exchange, and search through the availability designed data structure.

The data structure may be divided into a linear data structure and a non-linear data structure according to the type of data structure. The linear data structure may be a structure in which only one data is connected after one data. The linear data structure may include a list, a stack, a queue, and a deque. The list may mean a series of data sets in which an order exists internally. The list may include a linked list. The linked list may be a data structure in which data is connected in a scheme in which each data is linked in a row with a pointer. In the linked list, the pointer may include link information with next or previous data. The linked list may be represented as a single linked list, a double linked list, or a circular linked list depending on the type. The stack may be a data listing structure with limited access to data. The stack may be a linear data structure that may process (e.g., insert or delete) data at only one end of the data structure. The data stored in the stack may be a data structure (LIFO-Last in First Out) in which the data is input last and output first. The queue is a data listing structure that may access data limitedly and unlike a stack, the queue may be a data structure (FIFO-First in First Out) in which late stored data is output late. The deque may be a data structure capable of processing data at both ends of the data structure.

The non-linear data structure may be a structure in which a plurality of data are connected after one data. The non-linear data structure may include a graph data structure. The graph data structure may be defined as a vertex and an edge, and the edge may include a line connecting two different vertices. The graph data structure may include a tree data structure. The tree data structure may be a data structure in which there is one path connecting two different vertices among a plurality of vertices included in the tree. That is, the tree data structure may be a data structure that does not form a loop in the graph data structure.

In the present disclosure, a network function, an artificial neural network, and a neural network may be used to be exchangeable. From here on, it will be described uniformly using neural networks.

The data structure may include the neural network. In addition, the data structures, including the neural network, may be stored in a computer readable medium. The data structure including the neural network may also include data preprocessed for processing by the neural network, data input to the neural network, weights of the neural network, hyper parameters of the neural network, data obtained from the neural network, an active function associated with each node or layer of the neural network, and a loss function for training the neural network. The data structure including the neural network may include predetermined components of the components disclosed above. In other words, the data structure including the neural network may include all of data preprocessed for processing by the neural network, data input to the neural network, weights of the neural network, hyper parameters of the neural network, data obtained from the neural network, an active function associated with each node or layer of the neural network, and a loss function for training the neural network or a combination thereof. In addition to the above-described configurations, the data structure including the neural network may include predetermined other information that determines the characteristics of the neural network. In addition, the data structure may include all types of data used or generated in the calculation process of the neural network, and is not limited to the above. The computer readable medium may include a computer readable recording medium and/or a computer readable transmission medium. The neural network may be generally constituted by an aggregate of calculation units which are mutually connected to each other, which may be called nodes. The nodes may also be called neurons. The neural network is configured to include one or more nodes.

The data structure may include data input into the neural network. The data structure including the data input into the neural network may be stored in the computer readable medium. The data input to the neural network may include training data input in a neural network training process and/or input data input to a neural network in which training is completed. The data input to the neural network may include preprocessed data and/or data to be preprocessed. The preprocessing may include a data processing process for inputting data into the neural network. Therefore, the data structure may include data to be preprocessed and data generated by preprocessing. The data structure is just an example and the present disclosure is not limited thereto.

The data structure may include the weight of the neural network (in the present disclosure, the weight and the parameter may be used as the same meaning). In addition, the data structures, including the weight of the neural network, may be stored in the computer readable medium. The neural network may include a plurality of weights. The weight may be variable and the weight is variable by a user or an algorithm in order for the neural network to perform a desired function. For example, when one or more input nodes are mutually connected to one output node by the respective links, the output node may determine a data value output from an output node based on values input in the input nodes connected with the output node and the weights set in the links corresponding to the respective input nodes. The data structure is just an example and the present disclosure is not limited thereto.

As a non-limiting example, the weight may include a weight which varies in the neural network training process and/or a weight in which neural network training is completed. The weight which varies in the neural network training process may include a weight at a time when a training cycle starts and/or a weight that varies during the training cycle. The weight in which the neural network training is completed may include a weight in which the training cycle is completed. Accordingly, the data structure including the weight of the neural network may include a data structure including the weight which varies in the neural network training process and/or the weight in which neural network training is completed. Accordingly, the above-described weight and/or a combination of each weight are included in a data structure including a weight of a neural network. The data structure is just an example and the present disclosure is not limited thereto.

The data structure including the weight of the neural network may be stored in the computer-readable storage medium (e.g., memory, hard disk) after a serialization process. Serialization may be a process of storing data structures on the same or different computing devices and later reconfiguring the data structure and converting the data structure to a form that may be used. The computing device may serialize the data structure to send and receive data over the network. The data structure including the weight of the serialized neural network may be reconfigured in the same computing device or another computing device through deserialization. The data structure including the weight of the neural network is not limited to the serialization. Furthermore, the data structure including the weight of the neural network may include a data structure (for example, B-Tree, Trie, in-way search tree, AVL tree, and Red-Black Tree in a nonlinear data structure) to increase the efficiency of operation while using resources of the computing device to a minimum. The above-described matter is just an example and the present disclosure is not limited thereto.

The data structure may include hyper-parameters of the neural network. In addition, the data structures, including the hyper-parameters of the neural network, may be stored in the computer readable medium. The hyper-parameter may be a variable which may be varied by the user. The hyper-parameter may include, for example, a learning rate, a cost function, the number of training cycle iterations, weight initialization (for example, setting a range of weight values to be subjected to weight initialization), and Hidden Unit number (e.g., the number of hidden layers and the number of nodes in the hidden layer). The data structure is just an example and the present disclosure is not limited thereto.

Figure 8:
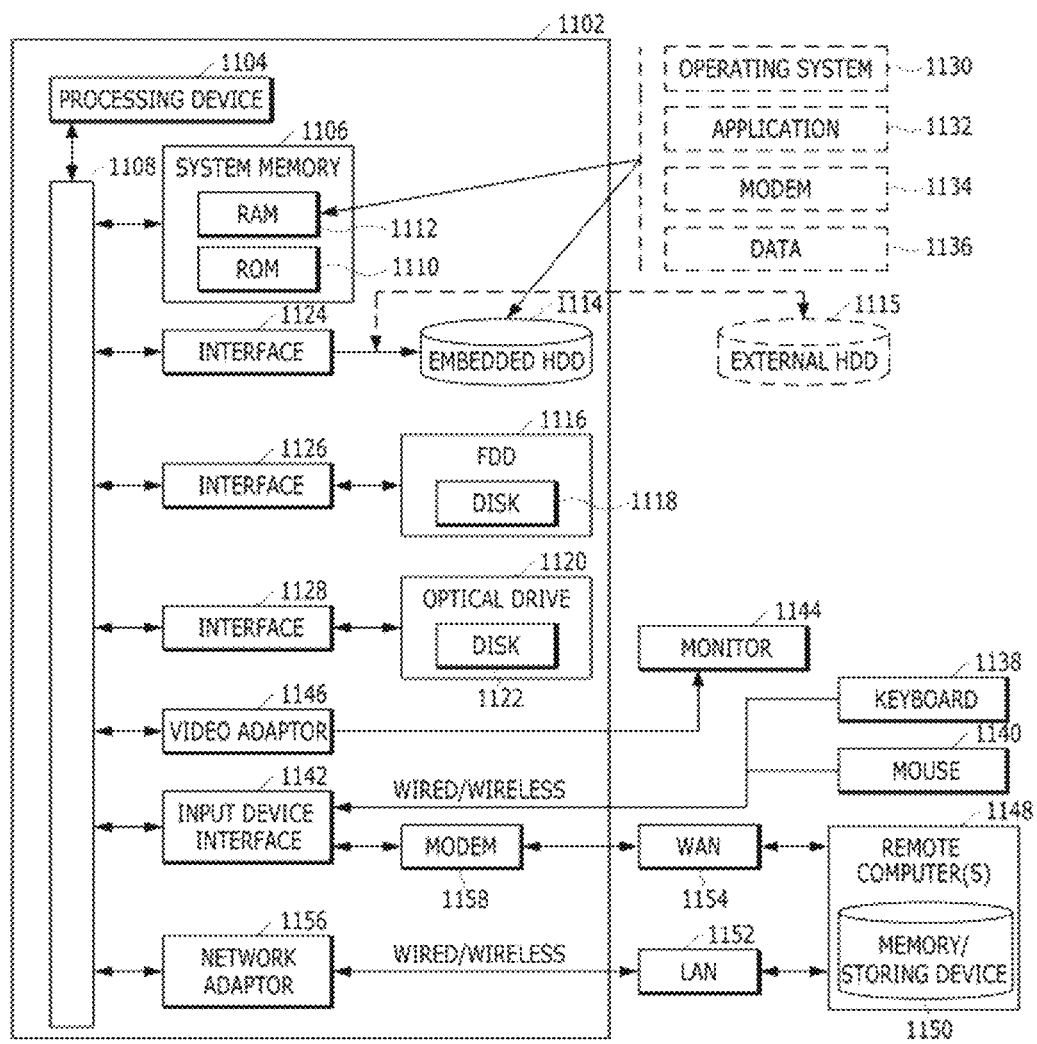
FIG. 8 is a simple and normal schematic view of an exemplary computing environment in which the exemplary embodiments of the present disclosure may be implemented.

FIG. 8 is a normal and schematic view of an exemplary computing environment in which the exemplary embodiments of the present disclosure may be implemented.

It is described above that the present disclosure may be generally implemented by the computing device, but those skilled in the art will well know that the present disclosure may be implemented in association with a computer executable command which may be executed on one or more computers and/or in combination with other program modules and/or a combination of hardware and software.

In general, the program module includes a routine, a program, a component, a data structure, and the like that execute a specific task or implement a specific abstract data type. Further, it will be well appreciated by those skilled in the art that the method of the present disclosure can be implemented by other computer system configurations including a personal computer, a handheld computing device, microprocessor-based or programmable home appliances, and others (the respective devices may operate in connection with one or more associated devices as well as a single-processor or multi-processor computer system, a mini computer, and a main frame computer.

The exemplary embodiments described in the present disclosure may also be implemented in a distributed computing environment in which predetermined tasks are performed by remote processing devices connected through a communication network. In the distributed computing environment, the program module may be positioned in both local and remote memory storage devices.

The computer generally includes various computer readable media. Media accessible by the computer may be computer readable media regardless of types thereof and the computer readable media include volatile and non-volatile media, transitory and non-transitory media, and mobile and non-mobile media. As a non-limiting example, the computer readable media may include both computer readable storage media and computer readable transmission media. The computer readable storage media include volatile and non-volatile media, transitory and non-transitory media, and mobile and non-mobile media implemented by a predetermined method or technology for storing information such as a computer readable instruction, a data structure, a program module, or other data. The computer readable storage media include a RAM, a ROM, an EEPROM, a flash memory or other memory technologies, a CD-ROM, a digital video disk (DVD) or other optical disk storage devices, a magnetic cassette, a magnetic tape, a magnetic disk storage device or other magnetic storage devices or predetermined other media which may be accessed by the computer or may be used to store desired information, but are not limited thereto.

The computer readable transmission media generally implement the computer readable command, the data structure, the program module, or other data in a carrier wave or a modulated data signal such as other transport mechanism and include all information transfer media. The term "modulated data signal" means a signal obtained by setting or changing at least one of characteristics of the signal so as to encode information in the signal. As a non-limiting example, the computer readable transmission media include wired media such as a wired network or a direct-wired connection and wireless media such as acoustic, RF, infrared and other wireless media. A combination of any media among the aforementioned media is also included in a range of the computer readable transmission media.

An exemplary environment 1100 that implements various aspects of the present disclosure including a computer 1102 is shown and the computer 1102 includes a processing device 1104, a system memory 1106, and a system bus 1108. The system bus 1108 connects system components including the system memory 1106 (not limited thereto) to the processing device 1104. The processing device 1104 may be a predetermined processor among various commercial processors. A dual processor and other multi-processor architectures may also be used as the processing device 1104.

The system bus 1108 may be any one of several types of bus structures which may be additionally interconnected to a local bus using any one of a memory bus, a peripheral device bus, and various commercial bus architectures. The system memory 1106 includes a read only memory (ROM) 1110 and a random access memory (RAM) 1112. A basic input/output system (BIOS) is stored in the non-volatile memories 1110 including the ROM, the EPROM, the EEPROM, and the like and the BIOS includes a basic routine that assists in transmitting information among components in the computer 1102 at a time such as in-starting. The RAM 1112 may also include a high-speed RAM including a static RAM for caching data, and the like.

The computer 1102 also includes an interior hard disk drive (HDD) 1114 (for example, EIDE and SATA), in which the interior hard disk drive 1114 may also be configured for an exterior purpose in an appropriate chassis (not illustrated), a magnetic floppy disk drive (FDD) 1116 (for example, for reading from or writing in a mobile diskette 1118), and an optical disk drive 1120 (for example, for reading a CD-ROM disk 1122 or reading from or writing in other high-capacity optical media such as the DVD, and the like). The hard disk drive 1114, the magnetic disk drive 1116, and the optical disk drive 1120 may be connected to the system bus 1108 by a hard disk drive interface 1124, a magnetic disk drive interface 1126, and an optical drive interface 1128, respectively. An interface 1124 for implementing an exterior drive includes at least one of a universal serial bus (USB) and an IEEE 1394 interface technology or both of them.

The drives and the computer readable media associated therewith provide non-volatile storage of the data, the data structure, the computer executable instruction, and others. In the case of the computer 1102, the drives and the media correspond to storing of predetermined data in an appropriate digital format. In the description of the computer readable media, the mobile optical media such as the HDD, the mobile magnetic disk, and the CD or the DVD are mentioned, but it will be well appreciated by those skilled in the art that other types of media readable by the computer such as a zip drive, a magnetic cassette, a flash memory card, a cartridge, and others may also be used in an exemplary operating environment and further, the predetermined media may include computer executable commands for executing the methods of the present disclosure. Multiple program modules including an operating system 1130, one or more application programs 1132, other program module 1134, and program data 1136 may be stored in the drive and the RAM 1112. All or some of the operating system, the application, the module, and/or the data may also be cached in the RAM 1112. It will be well appreciated that the present disclosure may be implemented in operating systems which are commercially usable or a combination of the operating systems.

A user may input instructions and information in the computer 1102 through one or more wired/wireless input devices, for example, pointing devices such as a keyboard 1138 and a mouse 1140. Other input devices (not illustrated) may include a microphone, an IR remote controller, a joystick, a game pad, a stylus pen, a touch screen, and others. These and other input devices are often connected to the processing device 1104 through an input device interface 1142 connected to the system bus 1108, but may be connected by other interfaces including a parallel port, an IEEE 1394 serial port, a game port, a USB port, an IR interface, and others.

A monitor 1144 or other types of display devices are also connected to the system bus 1108 through interfaces such as a video adapter 1146, and the like. In addition to the monitor 1144, the computer generally includes other peripheral output devices (not illustrated) such as a speaker, a printer, others.

The computer 1102 may operate in a networked environment by using a logical connection to one or more remote computers including remote computer(s) 1148 through wired and/or wireless communication. The remote computer(s) 1148 may be a workstation, a computing device computer, a router, a personal computer, a portable computer, a micro-processor based entertainment apparatus, a peer device, or other general network nodes and generally includes multiple components or all of the components described with respect to the computer 1102, but only a memory storage device 1150 is illustrated for brief description. The illustrated logical connection includes a wired/wireless connection to a local area network (LAN) 1152 and/or a larger network, for example, a wide area network (WAN) 1154. The LAN and WAN networking environments are general environments in offices and companies and facilitate an enterprise-wide computer network such as Intranet, and all of them may be connected to a worldwide computer network, for example, the Internet.

When the computer 1102 is used in the LAN networking environment, the computer 1102 is connected to a local network 1152 through a wired and/or wireless communication network interface or an adapter 1156. The adapter 1156 may facilitate the wired or wireless communication to the LAN 1152 and the LAN 1152 also includes a wireless access point installed therein in order to communicate with the wireless adapter 1156. When the computer 1102 is used in the WAN networking environment, the computer 1102 may include a modem 1158 or has other means that configure communication through the WAN 1154 such as connection to a communication computing device on the WAN 1154 or connection through the Internet. The modem 1158 which may be an internal or external and wired or wireless device is connected to the system bus 1108 through the serial port interface 1142. In the networked environment, the program modules described with respect to the computer 1102 or some thereof may be stored in the remote memory/storage device 1150. It will be well known that an illustrated network connection is exemplary and other means configuring a communication link among computers may be used.

The computer 1102 performs an operation of communicating with predetermined wireless devices or entities which are disposed and operated by the wireless communication, for example, the printer, a scanner, a desktop and/or a portable computer, a portable data assistant (PDA), a communication satellite, predetermined equipment or place associated with a wireless detectable tag, and a telephone. This at least includes wireless fidelity (Wi-Fi) and Bluetooth wireless technology. Accordingly, communication may be a predefined structure like the network in the related art or just ad hoc communication between at least two devices.

The wireless fidelity (Wi-Fi) enables connection to the Internet, and the like without a wired cable. The Wi-Fi is a wireless technology such as the device, for example, a cellular phone which enables the computer to transmit and receive data indoors or outdoors, that is, anywhere in a communication range of a base station. The Wi-Fi network uses a wireless technology called IEEE 802.11(a, b, g, and others) in order to provide safe, reliable, and high-speed wireless connection. The Wi-Fi may be used to connect the computers to each other or the Internet and the wired network (using IEEE 802.3 or Ethernet). The Wi-Fi network may operate, for example, at a data rate of 11 Mbps (802.11a) or 54 Mbps (802.11b) in unlicensed 2.4 and 5 GHz wireless bands or operate in a product including both bands (dual bands).

It will be appreciated by those skilled in the art that information and signals may be expressed by using various different predetermined technologies and techniques. For example, data, instructions, commands, information, signals, bits, symbols, and chips which may be referred in the above description may be expressed by voltages, currents, electromagnetic waves, magnetic fields or particles, optical fields or particles, or predetermined combinations thereof.

It may be appreciated by those skilled in the art that various exemplary logical blocks, modules, processors, means, circuits, and algorithm steps described in association with the exemplary embodiments disclosed herein may be implemented by electronic hardware, various types of programs or design codes (for easy description, herein, designated as software), or a combination of all of them. In order to clearly describe the intercompatibility of the hardware and the software, various exemplary components, blocks, modules, circuits, and steps have been generally described above in association with functions thereof. Whether the functions are implemented as the hardware or software depends on design restrictions given to a specific application and an entire system. Those skilled in the art of the present disclosure may implement functions described by various methods with respect to each specific application, but it should not be interpreted that the implementation determination departs from the scope of the present disclosure.

Various exemplary embodiments presented herein may be implemented as manufactured articles using a method, a device, or a standard programming and/or engineering technique. The term manufactured article includes a computer program, a carrier, or a medium which is accessible by a predetermined computer-readable storage device. For example, a computer-readable storage medium includes a magnetic storage device (for example, a hard disk, a floppy disk, a magnetic strip, or the like), an optical disk (for example, a CD, a DVD, or the like), a smart card, and a flash memory device (for example, an EEPROM, a card, a stick, a key drive, or the like), but is not limited thereto. Further, various storage media presented herein include one or more devices and/or other machine-readable media for storing information.

It will be appreciated that a specific order or a hierarchical structure of steps in the presented processes is one example of exemplary accesses. It will be appreciated that the specific order or the hierarchical structure of the steps in the processes within the scope of the present disclosure may be rearranged based on design priorities. Appended method claims provide elements of various steps in a sample order, but the method claims are not limited to the presented specific order or hierarchical structure.

The description of the presented exemplary embodiments is provided so that those skilled in the art of the present disclosure use or implement the present disclosure. Various modifications of the exemplary embodiments will be apparent to those skilled in the art and general principles defined herein can be applied to other exemplary embodiments without departing from the scope of the present disclosure. Therefore, the present disclosure is not limited to the exemplary embodiments presented herein, but should be interpreted within the widest range which is coherent with the principles and new features presented herein.

What is claimed is:

1. A method for obtaining data for training a neural network model, the method performed by one or more processors of a computing device, the method comprising:
   obtaining sample data;
   receiving a first user input for a first data set included the sample data;
   training a neural network model for predicting labeling information based on the first data set and the first user input;
   receiving a second user input for a second data set excluding the first data set among the sample data; and
   supplementing the second user input based on the first user input and obtaining a supplemented second data set based on the supplemented second user input,
   wherein the training the neural network model for predicting labeling information based on the first data set and the first user input includes:
   obtaining a first-second predicted user input of a second time point based on a first-first user input of a first time point by using the neural network model; and
   training the neural network model based on a first-second user input of the second time point included in the first user input and the first-second predicted user input,
   wherein the second time point is after the first time point.

2. The method of claim 1, wherein the first data set included in the sample data includes:
   a data set sampled based on diversity for the sample data.

3. The method of claim 1, wherein the receiving the first user input for the first data set included in the sample data includes:
   receiving the first user input related to a labeling operation for the first data set included in the sample data.

4. The method of claim 3, wherein the receiving the first user input related to the labeling operation for the first data set included in the sample data includes:
   receiving the first-first user input corresponding to the first time point for the first data set; and
   receiving the first-second user input corresponding to the second time point after the first time point for the first data set.

5. The method of claim 1, wherein the supplementing the second user input based on the first user input and obtaining a supplemented second data set based on the supplemented second user input includes:
   obtaining a first predicted user input based on the second user input by using the trained neural network model; and
   supplementing the second user input based on the first predicted user input and obtaining the supplemented second data set based on the supplemented second user input.

6. The method of claim 1, further comprising:
   performing an evaluation on the supplemented second data set;
   obtaining a third data set included in the sample data based on a result of the evaluation;
   receiving a third user input for the third data set; and
   obtaining a supplemented third data set based on the third user input and the third data set.

7. The method of claim 6, wherein performing the evaluation on the supplemented second data set includes:
   measuring uncertainty for the supplemented second data set.

8. The method of claim 7, wherein obtaining the third data set included in the sample data based on the result of the evaluation includes:
   obtaining the third data set among the sample data requiring additional information collection based on the measured uncertainty.

9. A non-transitory computer-readable storage medium storing a computer program including instructions that cause, wherein the computer program causes one or more processors to perform operations for obtaining data for training a neural network model when the computer program is executed by the one or more processors, the operations comprising: an operation of obtaining sample data; an operation of receiving a first user input for a first data set included in the sample data; an operation of training a neural network model for predicting labeling information based on the first data set and the first user input; an operation of receiving a second user input for a second data set excluding the first data set among the sample data; and an operation of supplementing the second user input based on the first user input and obtaining a supplemented second data set based on the supplemented second user input, wherein the operation of training the neural network model for predicting labeling information based on the first data set and the first user input includes: an operation of obtaining a first-second predicted user input of a second time point based on a first-first user input of a first time point by using the neural network model; and an operation of training the neural network model based on a first-second user input of the second time point included in the first user input and the first-second predicted user input, wherein the second time point is after the first time point.

10. The non-transitory computer-readable storage medium of claim 9, wherein the operation of receiving the first user input for the first data set included in the sample data includes:
    an operation of receiving the first user input related to a labeling operation for the first data set included in the sample data.

11. The non-transitory computer-readable storage medium of claim 10, wherein the operation of receiving the first user input related to the labeling operation for the first data set included in the sample data includes:
    an operation of receiving the first-first user input corresponding to the first time point for the first data set; and
    an operation of receiving the first-second user input corresponding to the second time point after the first time point for the first data set.

12. The non-transitory computer-readable storage medium of claim 9, wherein the operation of supplementing the second user input based on the first user input and obtaining a supplemented second data set based on the supplemented second user input includes:
    an operation of obtaining a first predicted user input based on the second user input by using the trained neural network model; and an operation of supplementing the second user input based on the first predicted user input and obtaining the supplemented second data set based on the supplemented second user input.

13. The non-transitory computer-readable storage medium of claim 9, wherein the operations further comprise:
an operation of performing an evaluation on the supplemented second data set;
an operation of obtaining a third data set included in the sample data based on a result of the evaluation;
an operation of receiving a third user input for the third data set; and
an operation of obtaining a supplemented third data set based on the third user input and the third data set.

14. The non-transitory computer-readable storage medium of claim 13, wherein the operation of performing the evaluation on the supplemented second data set includes:
an operation of measuring uncertainty for the supplemented second data set.

15. The non-transitory computer-readable storage medium of claim 14, wherein the operation of obtaining the third data set included in the sample data based on the evaluation result includes:
an operation of obtaining the third data set among the sample data requiring additional information collection based on the measured uncertainty.

16. A computing device comprising:
at least one processor; and
a memory,
wherein the at least one processor is configured to:
obtain sample data;
receive a first user input for a first data set included in the sample data;
train a neural network model for predicting labeling information based on the first data set and the first user input;
receive a second user input for a second data set excluding the first data set among the sample data; and
supplement the second user input based on the first user input and obtain a supplemented second data set based on the supplemented second user input,
wherein the training the neural network model for predicting labeling information based on the first data set and the first user input includes:
obtaining a first-second predicted user input of a second time point based on a first-first user input of a first time point by using the neural network model; and
training the neural network model based on a first-second user input of the second time point included in the first user input and the first-second predicted user input, wherein the second time point is after the first time point.

* * * * *